(12) United States Patent
Lien et al.

(10) Patent No.: US 12,528,065 B2
(45) Date of Patent: Jan. 20, 2026

(54) NANOCAPSULES AND PROCESS OF MAKING AND USING SAME

(71) Applicants: The Government of the United States, as represented by The Director of the Defense Health Agency, Fort Detrick, MD (US); The United States of America, as represented by the Secretary of the Navy, Silver Spring, MD (US)

(72) Inventors: Wen Lien, San Antonio, TX (US); Amber M. Mallory, Adkins, TX (US); John W. Simecek, Elgin, TX (US); Amer Tiba, Lake Bluff, IL (US); Trevor J. Smith, Woodbridge, VA (US); Zakiya R. Skeete, San Antonio, TX (US); Andrew P. Zane, Pittsford, NY (US); Kyumin Whang, Helotes, TX (US)

(73) Assignees: The Government of the United States, as represented by The Director of the Defense Health Agency, Fort Detrick, MD (US); The United States of America, as represented by the Secretary of the Navy, Silver Spring, MD (US)

( * ) Notice: Subject to any disclaimer, the term of this patent is extended or adjusted under 35 U.S.C. 154(b) by 172 days.

(21) Appl. No.: 17/392,432

(22) Filed: Aug. 3, 2021

(65) Prior Publication Data
US 2023/0051247 A1 Feb. 16, 2023

(51) Int. Cl.
| | |
|---|---|
| *B01J 13/22* | (2006.01) |
| *A61K 6/17* | (2020.01) |
| *A61K 6/62* | (2020.01) |
| *A61K 6/71* | (2020.01) |
| *A61K 6/893* | (2020.01) |
| *B82Y 5/00* | (2011.01) |
| *B82Y 30/00* | (2011.01) |

(52) U.S. Cl.
CPC .......... *B01J 13/22* (2013.01); *A61K 6/17* (2020.01); *A61K 6/62* (2020.01); *A61K 6/71* (2020.01); *A61K 6/893* (2020.01); *B82Y 5/00* (2013.01); *B82Y 30/00* (2013.01)

(58) Field of Classification Search
CPC .......... A61K 8/11; C09D 7/70; B82Y 30/00
See application file for complete search history.

(56) References Cited

U.S. PATENT DOCUMENTS

| | | | |
|---|---|---|---|
| 6,858,659 B2 † | 2/2005 | White | |
| 7,569,625 B2 † | 8/2009 | Keller | |
| 8,383,697 B2 † | 2/2013 | Wilson | |
| 9,119,774 B2 * | 9/2015 | Gross | A61K 6/893 |
| 9,931,281 B2 † | 4/2018 | Sun | |
| 10,927,271 B2 † | 2/2021 | Sato | |
| 2008/0299391 A1 † | 12/2008 | White | |
| 2008/0300340 A1 * | 12/2008 | Gross | A61K 6/893 |
| | | | 523/120 |
| 2009/0047633 A1 * | 2/2009 | Huo | A61K 6/30 |
| | | | 523/105 |
| 2011/0071234 A1 * | 3/2011 | Gross | A61K 6/887 |
| | | | 523/116 |
| 2012/0132104 A1 * | 5/2012 | Ruppert | A61K 6/77 |
| | | | 546/14 |
| 2018/0305492 A1 | 10/2018 | Taden et al. | |
| 2020/0330951 A1 * | 10/2020 | Rodrigo-Gomez | B01J 13/14 |

FOREIGN PATENT DOCUMENTS

| | | | | |
|---|---|---|---|---|
| CN | 109517443 A | † | 3/2019 | |
| EP | 2783674 A2 | * | 10/2014 | A61C 13/082 |
| EP | 3156434 A1 | † | 4/2017 | |

OTHER PUBLICATIONS

US Navy and University of Maryland Contract—N3239818P0105 with Amendments 1 and 2 Jul. 3, 2018.
Huyang, G.; Debertin, A. E.; Jirun Sun, J.; Design and development of self-healing dental composites, Mater Des. 2016; 94:295-302. doi:10.1016/j.matdes.2016.01.046.
Huyang, G.; Jirun Sun, J.; Clinically Applicable Self-Healing Dental Resin Composites. MRS Advances / FirstView Article 2016, 1-6.
Wertzberger, B. E.; Steere, J. T.; Pfeifer, R. M.; Nensel, M. A.; Latta, M. A.; Gross, S. M. Physical characterization of a self-healing dental restorative material. J. Appl. Polym. Sci. 2010, 118, 428-434.
Ouyang, X.; Huang, X.; Pan, Q.; Zuo, C.; Huang, C.; Yang, X.; Zhao, Y.; Synthesis and characterization of triethylene glycol dimethacrylate nanocapsules used in a self-healing bonding resin. J Dent 2011, 39, 825-833.
Guo, J.; Qiuhua, P.; Cui, H.; Yanbing, Z.; Xiaobai, O.; Yonghong, H.; Sansan, D.The role of surfactant and costabilizer in controlling size of nanocapsules containing TEGDMA in miniemulsion. J. Wuhan Univ. Technol.—Mat. Sci. Edit. 2009, 24, 1004-1006.
Wu, J.; Weir, M. D.; Zhang, Q.; Zhoud, C.; Mary Anne S. Melob, M. A. S.; Xub, H. H. K.; Novel self-healing dental resin with microcapsules of polymerizable triethylene glycol dimethacrylate and N, N-dihydroxyethyl-p-toluidine. Dent Mater 2016, 32, 294-304.
Menikheim, S.; Thesis Polyurethane Nanocapsules in Biomaterials 2019, 1-176.
Oliver, W.C.; Pharr G.M.; An improved technique for determining hardness and elastic modulus using load and displacement sensing indentation experiments. J Mater Res. 1992, 7(6),1564-1583.
English abstract for CN109517443 A, Mar. 26, 2019.

\* cited by examiner
† cited by third party

*Primary Examiner* — Alexandre F Ferre
(74) *Attorney, Agent, or Firm* — CAHN & SAMUELS, LLP

(57) ABSTRACT

The present invention relates to nanocapsules, nanocapsule substrate mixtures and processes of making and using same. Such nanocapsule substrate mixtures can provide biological articles such as teeth, bones, and tissues as well as nonbiological articles such as ceramics and polymers, with self-healing capabilities and/or antimicrobial properties. Applicants' nanocapsules allow for a high packing density as well as good mechanical and physical properties that provide the desired performance in each desired application.

16 Claims, No Drawings

NANOCAPSULES AND PROCESS OF MAKING AND USING SAME

RIGHTS OF THE GOVERNMENT

The invention described herein may be manufactured and used by or for the Government of the United States for all governmental purposes without the payment of any royalty.

CROSS-REFERENCE TO RELATED APPLICATION

The present application claims priority to U.S. Provisional application Ser. No. 63/157,933 filed Mar. 8, 2021, and U.S. Provisional Application Ser. No. 63/062,551 filed Aug. 7, 2020, the contents of both such provisional applications hereby being incorporated by reference in their entry.

FIELD OF THE INVENTION

The present invention relates to nanocapsules, nanocapsule substrate mixtures and process of making and using same.

BACKGROUND OF THE INVENTION

The present invention relates to nanocapsules, nanocapsule substrate mixtures and processes of making and using same. Such nanocapsule substrate mixtures can provide biological articles such as teeth, bones, and tissues as well as nonbiological articles such as ceramics (including glass), and polymers, with self-healing capabilities and/or antimicrobial properties. Such nanocapsule substrate mixtures are particularly useful in providing teeth with self-healing capabilities. Currently, most damaged articles must be timely and actively repaired to return them to a useful and/or safe state. This requires human intervention that, if not timely, can result in irreparable damage that can lead to an unrepairable condition.

Applicants recognized that if the need for human intervention could be taken out of the equation, repairs could be made on a timelier basis and irreparable damage could be minimized or completely avoided. Applicants discovered that by applying a substrate that contains a judiciously selected plurality nanocapules, such goal can be achieved. Applicants disclose herein such nanocapsules, nanocapsule substrate mixtures and processes of making and using same. Applicants' nanocapsules allow for a high packing density as well as good mechanical and physical properties that provide the desired performance in each desired application.

SUMMARY OF THE INVENTION

The present invention relates to nanocapsules, nanocapsule substrate mixtures and processes of making and using same. Such nanocapsule substrate mixtures can provide biological articles such as teeth, bones, and tissues as well as nonbiological articles such as ceramics and polymers, with self-healing capabilities and/or antimicrobial properties. Applicants' nanocapsules allow for a high packing density as well as good mechanical and physical properties that provide the desired performance in each desired application.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Nanocapsules and Substrate Comprising Same

For purposes of this specification, headings are not considered paragraphs and thus this paragraph is paragraph fifteen of the present specification. The individual number of each paragraph above and below this paragraph can be determined by reference to this paragraph's number. In this paragraph fifteen, Applicants disclose a plurality of nanocapsules comprising a shell having an exterior and a core, said shell encapsulating said core, said shell comprising polyurethane said shell's exterior comprising an optional silica coating, said core comprising:

a) an initiator and a stabilizer, said plurality of nanocapsules having an average stabilizer to initiator weight ratio from about 1:5 to about 1:25, preferably said plurality of nanocapsules having an average stabilizer to initiator weight ratio being from about 1:8 to about 1:20, more preferably, said plurality of nanocapsules having an average stabilizer to initiator weight ratio being from about 1:8 to about 1:15, most preferably said plurality of nanocapsules having an average stabilizer to initiator weight ratio being from about 1:10 to about 1:15;

b) a monomer and catalyst, said plurality of nanocapsules having a catalyst and monomer volume ratio from about 1:5 to about 1:25, preferably said plurality of nanocapsules having an average a catalyst and monomer volume ratio being from about 1:8 to about 1:20, more preferably, said plurality of nanocapsules having an average a catalyst and monomer volume ratio being from about 1:10 to about 1:18, most preferably said plurality of nanocapsules having an average a catalyst and monomer volume ratio being from about 1:12 to about 1:16; or c) a monomer, catalyst, and tertiary amine, said plurality of nanocapsules having an average tertiary amine to catalyst to monomer weight:volume:volume ratio from about 1:0.6:10 to about 1:2.2:30, preferably said plurality of nanocapsules having an average tertiary amine to catalyst to monomer weight:volume:volume ratio being from about 1:0.8:12 to about 1:2:28, more preferably, said plurality of nanocapsules having an average tertiary amine to catalyst to monomer weight:volume:volume ratio being from about 1:1:15 to about 1:1.8:25, most preferably said plurality of nanocapsules having an average tertiary amine to catalyst to monomer weight:volume:volume ratio being from about 1:1.2:18 to about 1:1.6:22;

said plurality of nanocapsules having an average size of about 600 nanometers to about 1100 nanometers, preferably said nanocapsules having an average size of about 600 nanometers to about 1000 nanometers, more preferably said nanocapsules having an average size of about 600 nanometers to about 900 nanometers, most preferably said plurality of nanocapsules having an average size of about 750 nanometers to about 850 nanometers; and said plurality of nanocapsules having an average compressive strength of from about 30 megapascals to about 70 megapascals.

Applicants disclose the plurality of nanocapsules according to paragraph fifteen, wherein
a) said initiator being selected from the group consisting of benzoyl peroxide, camphorquinone, 4-N,N-dimethyl aminophenyl acetic acid, 4-N,N-dimethyl aminobenzyl alcohol and mixtures thereof;
b) said stabilizer comprises butyl hydroxytoluene;
c) said monomer comprises 1,6-hexanediol dimethacrylate;
d) said tertiary amine is selected from the group consisting of p-tolyl imino diethanol, ethyl dimethyl aminobenzoate, N,N'dimethyl p-toluidine, Triethylamine, Dimethyl Aniline and mixtures thereof; and
e) said catalyst comprises dibutlytin dilaurate.

Applicants disclose a substrate nanocapsule mixture comprising, based on total substrate nanocapsule mixture weight,
a) from about 2% to about 22% of a plurality of nanocapsules according to paragraphs fifteen through sixteen, preferably said substrate nanocapsule mixture comprising, based on total substrate nanocapsule mixture weight, from about 5% to about 20% of a plurality of nanocapsules according to paragraphs fifteen through sixteen, more preferably said substrate nanocapsule mixture comprises, based on total substrate nanocapsule mixture weight, from about 10% to about 12% of a plurality of nanocapsules according to Paragraphs fifteen through sixteen; and
b) from about 30% to about 58% of a mixture of unencapsulated monomer, unencapsulated stabilizer and unencapsulated initiator, preferably from about 35% to about 55% of a mixture of unencapsulated monomer, unencapsulated stabilizer and unencapsulated initiator, more preferably from about 43% to about 53% of a mixture of unencapsulated monomer, said mixture of unencapsulated monomer, unencapsulated stabilizer and unencapsulated initiator comprising, based on told mixture of unencapsulated monomer, unencapsulated stabilizer and unencapsulated initiator,
(i) from about 98% to about 99% of unencapsulated monomer;
(ii) from about 0.01% to about 0.03% unencapsulated stabilizer; and
(iii) from about 0.99% to about 1.97% unencapsulated initiator;
c) the balance of said substrate nanocapsule mixture comprising filler, preferably said substrate nanocapsule mixture comprises, based on total substrate nanocapsule mixture weight, from about 30% to about 60% filler, more preferably said substrate nanocapsule mixture comprises, based on total substrate nanocapsule mixture weight, from about 35% to about 45% filler, most preferably said substrate nanocapsule mixture comprises, based on total substrate nanocapsule mixture weight, from about 40% to about 45% filler.

Applicants disclose the substrate nanocapsule mixture according to paragraph seventeen wherein:
a) said unencapsulated monomer is selected from the group consisting of triethylene glycol dimethacrylate, 1,6-hexanediol dimethacrylate, dodecanediol dimethacryate, urethane dimethacrylate and mixtures thereof,
b) said unencapsulated stabilizer comprises butyl hydroxytoluene;
c) said unencapsulated initiator comprises camphorquinone, diphenyl (2, 4, 6-trimethylbenzoyl) phosphine oxide, Phenylbis (2, 4, 6-trimethylbenzoyl) phosphine oxide, and mixtures thereof,
d) said filler comprises a material selected from the group consisting of $SiO_2$, zirconia, FA1 Si-glass, Ba—Al—B—Si glass, $YbF_3$ and mixtures thereof; and
e) said tertiary amine is selected from the group consisting of p-tolyl imino diethanol, ethyl dimethyl aminobenzoate, N,N'dimethyl p-toluidine, Triethylamine, Dimethyl Aniline and mixtures thereof.

The material components of Applicants' nanocapsules and substrate nanocapsule mixtures can be obtained from commercial vendors. Benzoyl peroxide, butyl hydroxytoluene, dodecanediol dimethacryate, $SiO_2$ (nano), Zirconia, YbF3, p-tolyl imino diethanol, ethyl dimethyl aminobenzoate, dibutlytin dilaurate, N,N'dimethyl p-toluidine, Triethylamine, Dimethyl Aniline, diphenyl (2, 4, 6-trimethylbenzoyl) phosphine oxide, and Phenylbis (2, 4, 6-trimethylbenzoyl) phosphine oxide were purchased from Sigma-Aldrich, St Louis, MO, USA and also from Fisher Science Education, Nazareth, PA, USA. Butyl hydroxytoluene was also purchased from MP Biomedicals, LLC Solon, OH, USA. Camphorquinone, 4-N,N-dimethyl aminophenyl acetic acid, triethylene glycol dimethacrylate, urethane dimethacrylate, and $SiO_2$ (glass) were purchased from DM Healthcare Products, Inc, San Diego, CA, USA. 4-N,N-dimethyl aminophenyl acetic acid was also purchased from Acros Organics, Fair Lawn, NJ, USA. 1,6-hexanediol dimethacrylate, GI SP2034 Glass powder TF grind Specialty Glass, and Ba—Al—B—Si glass were purchased from ESSTECH, Inc Essington, PA, USA.

Method of Using Nanocapsules

Applicants disclose a method of providing a self-healing capability to an article comprising applying a substrate nanocapsule mixture according to paragraphs seventeen through eighteen to the surface and/or interior of an article and curing said substrate nanocapsule mixture by subjecting said substrate nanocapsule mixture to light and/or chemically curing said substrate nanocapsule mixture by rupturing one or more of said substrate nanocapsule mixture's nanocapsules, preferably said light has a wavelength from about 380 nm to about 500 nm. When the substrate nanocapsule mixture's nanocapsule's rupture, the contains of such nanocapsules' cores are exposed to and react with the other components of substrate nanocapsule mixture's. Thus, a chemical cure of the substrate nanocapsule mixture occurs.

Applicants disclose the method of paragraph twenty wherein said article is a tooth comprising a chip and/or cavity and said substrate nanocapsule mixture has been applied to said chip and/or cavity prior to curing said substrate nanocapsule mixture and said substrate nanocapsule mixture is optionally contoured after said curing.

Applicants disclose the method of paragraphs twenty through twenty-one wherein said chip and/or cavity has been subjected to the following processes in the following order: cleaning, etching, bonding agent treatment and bonding agent curing, prior to the application of said substrate nanocapsule mixture.

Applicants disclose the method of paragraphs twenty through twenty-two wherein said substrate nanocapsule mixture is applied incrementally to said tooth exhibiting a chip and/or cavity at the time of defect correction; preferably said substrate nanocapsule mixture is cured incrementally during restoration process.

Applicants disclose the method of paragraph twenty wherein said article comprises bone.

Test Methods

Characterization of a nanocapsule includes the assessments of capsule morphology, physical properties, cargo content, and polymerizing reaction.
  a) The prepared nanocapsule is dried in a vacuum oven, placed on a specimen holder, sputter coated with gold-palladium, and inserted into a scanning electron microscope (SEM) model Jeol JSM-IT500 for assessment.
  b) Once the SEM image is obtained, an image-processing software (ImageJ version 18.0_112) is applied to measure the capsule morphology and diameter. 800 capsules are measured to yield an average nanocapsule diameter which for purpose of the present application is considered the average particle size. The capsule shell thickness for purposes of the present calculation is taken as 80 nm. Thus 100 nm is subtracted from the measured average mean diameter is used to calculate the mean internal capsule volume using the following formula for the volume of a sphere Volume=$4/3\pi r^3$ wherein r=one half of the mean diameter minus 100 nm.
  c) To measure particle's elastic modulus and hardness, five specimens of the new nanocapsule-resin complexes are formulated in accordance to Paragraph 0014, 0015, and 0016. Specimens (n=5) are tested using a nanoindenter (iNano, Nanomechanics, Oak Ridge, TN, USA) at room temperature. A Berkovich tip (#TB26961, Micro Star Technologies, Huntsville, TX, USA) with a 20 nm radius and 65.3° nominal angle is used to measure all specimens. All indentations are performed after thermal drift rate reached below 0.05 nm/s threshold. The maximum indentation load is 5 mN, and Poisson's ratio for all specimens is 0.3. An array of indents (10 indents) is imprinted on the specimen surface. Each consecutive indent is spaced 2 μm apart from each other to avoid any interference of residual stresses from adjacent imprints. Force-displacement curves for the indents are used to evaluate the elastic moduli. For each indent, elastic modulus is calculated using the standard methods of Oliver and Pharr (1992) An improved technique for determining hardness and elastic modulus using load and displacement sensing indentation experiments. J Mater Res. 7(6):1564-1583. The Elastic modulus, E (GPa), per group was computed with the following expression, $$E = (1-v^2)\left(\frac{1}{E_r} - \frac{1-v_{tip}^2}{E_{tip}}\right)^{-1}$$

where v and $E_r$ (GPa) are the Poisson's ratio (v=0.3) and reduced modulus, and $v_{tip}$ and $E_{tip}$ (GPa) are the Poisson's ratio (0.07) and elastic modulus (1141 GPa) of the Berkovich indenter, respectively. The nanoindentation hardness is obtained from the indentation load divided by the projected contact area, A (nm$^2$):Hardness=P/A, where P (mN) is the maximum contact force exerted by the indenter onto the sample. To verify nanocapsule contains cargo, the fractured nanocapsules are imaged using the aforementioned SEM.
  d) To measure the compressive strength of the new nanocapsule-resin complex, ten cylindrical specimens (diameter=4 mm and height=6 mm) of the new nanocapsule-resin complexes are formulated in accordance to Paragraph 0014, 0015, and 0016. A stainless steel mold is used to prepare each specimen. The mold is: (1) lightly lubricated with a nonreactive lubricant (Vaseline, Unilever, Englewood Cliffs, NJ, USA); (2) placed on a Mylar strip-covered glass slide; and, (3) filled with the test formulation. Care is taken to exclude any air bubbles. Next, another Mylar strip is placed over the sample, followed by a second microscope slide. After finger pressure is used to displace excess materials, the second microscope slide is removed. Then, the top and bottom surfaces of the specimen are photopolymerized with a curing light (1270±30 mW/cm$^2$), 60 seconds per surface. The compressive strength of the nanocapsules is measured by placing a nanocapsule-resin complex under a universal testing machine (Instron). The stress at which nanocapsules are crushed is recorded as compressive strength in MPa at a crosshead speed of 1 millimeter per minute using a flathead cylinder.
  e) To measure the flexural strength and modulus of the new nanocapsule-resin complex, a flexural test is conducted in accordance with ISO 4049 (2019). Ten rectangular specimens (2 mm×2 mm×25 mm) are formulated in accordance to Paragraph 0014, 0015, and 0016. A stainless steel mold is used to prepare each specimen. The mold is: (1) lightly lubricated with a nonreactive lubricant (Vaseline, Unilever, Englewood Cliffs, NJ, USA); (2) placed on a Mylar strip-covered glass slide; and, (3) filled with the test formulation. Care is taken to exclude any air bubbles. Next, another Mylar strip is placed over the sample, followed by a second microscope slide. After finger pressure is used to displace excess materials, the second microscope slide is removed. Then, the top and bottom surfaces of the specimen are photopolymerized in three separate overlapping increments of 20-seconds each with a curing light (1270±30 mW/cm$^2$) for a total of 120-seconds.

The specimens are stored in 37° C. distilled water for 24 hours and then tested using a 3-point-bend apparatus and universal testing machine (ElectroPuls E3000, Instron, Norwood, MA, USA). Crosshead speed is 1 mm/min. The flexural strength is calculated using the equation:

$$\sigma = \frac{3PL}{2wz^2}$$

Here, P, L, w, and z are: load at fracture, support span length (20 mm), specimen width, and specimen depth respectively. The flexural modulus is determined from the slope of the linear region of the load—deflection curve.

f) The content of nanocapsule is measured using thermogravimetric analysis (TGA). Nanocapsules are placed into an aluminum oxide crucible. It is then inserted into the TGA chamber. Weight loss of nanocapsules as a function of temperature is recorded and calculated using standardized formulas, $$W_{filler}\ \% = \frac{W_{final}}{W_{initial}} 100,$$

where $W_{filler}\%$ is the percent filler weight; $W_{final}$ is the final weight of crucible; and, $W_{initial}$ is the initial weight of crucible, which are then analyzed to determine the weight percent content of a nanocapsule.

g) To evaluate the cargo of nanocapsule is capable to initiate polymerization, the nanocapsules are crushed using a universal testing machine and are mixed with monomers. Qualitatively, the sample is visually checked for curing, and images are recorded using light microscopy outfitted with an optical camera to demonstrate solidification. Then, it is quantitatively tested by measuring the hardness using a microindenter.

h) To test the fatigue behavior the new nanocapsule-resin complex, ten rectangular specimens (4 mm×4 mm×25 mm) of the new nanocapsule-resin complexes are formulated in accordance to Paragraph 0014, 0015, and 0016. A stainless steel mold is used to prepare each specimen. The mold is: (1) lightly lubricated with a nonreactive lubricant (Vaseline, Unilever, Englewood Cliffs, NJ, USA); (2) placed on a Mylar strip-covered glass slide; and, (3) filled with the test formulation. Care is taken to exclude any air bubbles. Next, another Mylar strip is placed over the sample, followed by a second microscope slide. After finger pressure is used to displace excess materials, the second microscope slide is removed. Then, the top and bottom surfaces of the specimen are photopolymerized in three separate overlapping increments of 20-seconds each with a curing light (1270±30 mW/cm²) for a total of 120-seconds. The specimens are stored in 37° C. distilled water for 24 hours and then tested using a 3-point-bend apparatus and universal testing machine (ElectroPuls E3000, Instron, Norwood, MA, USA). Crosshead speed is 1 mm/min. The flexural fatigue stress applied per specimen is determined by using a 60% of the averaged ultimate flexural stress, which is defined as the maximum stress at which a material can withstand while in its flexural state prior to breaking or catastrophic failure. A sinusoidal stress is applied, and its amplitude is the standard deviation of the averaged ultimate flexural stress. For each time interval or number of sinusoidal cycles, the survival probability is calculated as the number of samples surviving divided by the number of samples underwent catastrophic failure.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

Today's dental restorations may possess desirably high strength-to-weight ratios, but they lack the ability of self-healing. As an emerging class of smart materials, this invention is able to assist autonomous repair when fractures in the restoration occur. In a nonlimiting aspect, this invention can be used to target three fundamental fractures of a dental restoration: spontaneous fracture, fracture from environmental assault, and fracture from fatigue damage induced through aging. With this self-healing functionality, dental restorations could remarkably improve their longevity. The incorporation of these nano-particles containing initiators will enhance the mechanical strength and useful lifetime of dental restorations. This will decrease the need for replacing restorations, resulting in fewer emergency dental visits.

Example 2

A nonlimiting embodiment of this invention is described as a novel nanoencapsulation in which the cargo consists of polymeric initiator (benzoyl peroxide) and polymeric stabilizer (butyl hydroxytoluene). The chemical compound that is used to encapsulate the cargo is polyurethane. These nanocapsules can be applied in the following fashions:

a) First, they are to be incorporated into a three-part polymerization system, which consists of: 1) non-encapsulated resin-matrix, made up of free monomers, polymers, initiator, and stabilizer, 2) fillers, made up of glass particles, zirconium particles, and fluoro-aluminum glass particles, 3) nanoencapulated monomer encased by polyurethane and nanoencapsulated initiator and stabilizer encased by polyurethane, forming a new dental restorative material, whose novelty is the ability to self-heal. Self-healing is accomplished via encapsulated healing agents embedded within a polymerization system, or more commonly referred as resin-based composite.

b) After placement of this novel resin-based composite in an injured tooth, this invention can repair future damage by triggering an autonomic functional response through which healing agents are released to provide subsequent polymerization, thereby restoring tooth form and function. Specifically, upon secondary perturbation, such as microcrack formation, the nanoencapsulated cargo, containing the initiator and stabilizer, are released and are able to freely interact with their surrounding resin matrix, which is generally composed of Triethylene glycol dimethacrylate and bisphenol A-glycidyl methacrylate (Bis-GMA). The interaction between the nanoencapsulated cargo and the resin-matrix will trigger a self-polymerizing, chemical reaction, which at its termination, the "self-healing" process will be completed.

Example 3

In a nonlimiting aspect, the methodology to create such nanocapsules is unique in that it is the first technical approach that dually incorporates initiator and stabilizer in one nanocapsule. This approach preserves initiator functionality over time. A nonlimiting, description of this invention is listed:
 a) 1.1 g of sodium dodecyl sulfate (SDS) are added into a beaker containing 70 ml of deionized (DI) water, while the beaker is submerged in a 50° C. water bath. The mixture is stirred 300 RPM until dissolution is completed. Then, 1.145 ml of hexadecane (HD) is added, resulting a "mini-emulsion" solution.
 b) In a glass vial, 0.05 g of BPO and 0.005 g BHT are suspended in 2.094 ml of IPDI and vortexed at room temperature until dissolution, resulting a "pre-emulsification" solution.
 c) Using a syringe, the "pre-emulsification" solution is slowly dripped into the "mini-emulsion" solution under 400 RPM stirring for 10 min on a 50° C. water bath. An additional 10 min of 400 RPM stirring on a 50° C. water bath was applied to ensure homogenous mixing. Next, the solution was sonicated using a sonicator (QSonics) fitted with a microprobe at 1% power of 700 W for 1 min at room temperature.
 d) In another beaker, a solution of 5.9 g of HDOH dissolved in 10 ml of deionized water is prepared at room temperature. Then, this solution is slowly added under sonication to the mixtures containing "mini-emulsion" and "pre-emulsification" solutions as described in c.
 e) Afterwards, the final mixture as described in d is stirred 1000 RPM for 8 hours on a 50° C. water bath. Then, the stirring rate is changed from 1000 to 500 RPM, and the solution is stirred for an additional 24 hours on a 50° C. water bath.
 f) After 24 hours, the solution is centrifuged for 20 min at 4700 RPM and 4° C. and washed with DI water; this cycle is repeated 5 times. The solution was cooled to −80° C. for one hour and then freeze-dried for 72 hours. The lyophilized capsules are stored for evaluation. The final size and poly-dispersity of the capsules can be adjusted by altering the overall concentrations and ratios of the reactants.

Example 4

In a nonlimiting aspect, the methodology to create such nanocapsules is unique in that it is the first technical approach that incorporates tertiary amine, catalyst and monomer in one nanocapsule. This approach protects and encapsulates unreacted monomer over time, preserving its ability to self-heal when exposed. A nonlimiting description of this invention is listed:
 a) 0.66 g of sodium dodecyl sulfate are added into a beaker containing 70 ml of deionized water, while the beaker is submerged in a 50° C. water bath. The mixture is stirred 300 RPM until dissolution is completed.
 b) In a glass vial, 0.66 ml of hexadecane is added to 2.2 ml of IPDI, 2.71 ml of 1,6-hexanediol dimethacrylate, and 0.14 g of p-tolyl imino diethanol. This mixture is vortexed at room temperature until dissolution.
 c) Using a syringe, over a 15-20 minute period the solution in step b is slowly dripped into the mixture from step a under 400 RPM stirring at 50° C. An additional 5 min of 400 RPM stirring at 50° C. was applied to ensure homogenous mixing. Next, the solution was sonicated using a sonicator (Vibra) 38% power and 130 W for 1 min at room temperature.
 d) Over a 1 minute period, dibutlytin dilaurate is slowly dripped into step c; next the solution is sonicated at the above settings for 4 minutes.
 e) Afterwards, the final mixture as described in d is stirred 1000 RPM for 8 hours at 50° C.
 (f) 0 After 24 hours, the solution is centrifuged for 20 min at 4700 RPM and 4° C. and washed with DI water; this cycle is repeated 5 times.
 g) The solution is filtered with Whatman filter disc with 5 micron poresize.
 h) The solution was cooled to −80° C. for one hour and then freeze-dried for 72 hours.
 i) When dry, the nanocapsules appear as a white powder; the lyophilized capsules are stored at −80° C.

Example 5

In one aspect, Applicants disclose a substrate nanocapsule-resin mixture/complex as follows:

|  | % Self Healing Particles | % Monomers/Stabilizers/Initiators | % Filler | Total |
|---|---|---|---|---|
| Lower | 2 | 53 | 45 | 100 |
| Bound | 5 | 55 | 40 | 100 |
|  | 10 | 30 | 60 | 100 |
| Upper | 22 | 43 | 35 | 100 |
| Bound | 20 | 35 | 45 | 100 |
|  | 12 | 58 | 30 | 100 |

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed:
1. A plurality of nanocapsules, each nanocapsule consisting of:
 a shell comprising polyurethane; and
 a core, said shell encapsulating said core, said core comprising:
  a monomer comprising 1,6-hexanediol dimethacrylate, catalyst, and a tertiary amine selected from the group consisting of p-tolyl imino diethanol, ethyl dimethyl aminobenzoate, N,N'-dimethyl p-toluidine, triethylamine, dimethyl aniline and mixtures thereof.
2. A substrate nanocapsule mixture comprising, based on total substrate nanocapsule mixture weight,
 a) from about 2% to about 22% of a plurality of nanocapsules according to claim 1; and b) from about 30% to about 58% of a mixture of unencapsulated monomer, unencapsulated stabilizer and unencapsulated initiator, said mixture comprising, based on a total weight of the mixture,
  (i) from about 98% to about 99% of unencapsulated monomer selected from the group consisting of triethylene glycol dimethacrylate, 1,6-hexanediol dimethacrylate, dodecanediol dimethacryate, urethane dimethacrylate and mixtures thereof;
  (ii) from about 0.01% to about 0.03% unencapsulated stabilizer comprises butyl hydroxytoluene; and
  (iii) from about 0.99% to about 1.97% unencapsulated initiator comprising camphorquinone, diphenyl (2, 4, 6-trimethylbenzoyl) phosphine oxide, phenylbis (2, 4, 6-trimethylbenzoyl) phosphine oxide, and mixtures thereof;
c) the balance of said substrate nanocapsule mixture comprising filler comprising a material selected from the group consisting of $SiO_2$, zirconia, F—Al Si-glass, Ba—Al—B—Si glass, $YbF_3$ and mixtures thereof.

3. A substrate nanocapsule mixture according to claim 2 comprising, based on total substrate nanocapsule mixture weight, from about 40% to about 45% filler.

4. A substrate nanocapsule mixture according to claim 2, wherein the filler comprises F—Al Si-glass or Ba—Al—B—Si glass.

5. A substrate nanocapsule mixture according to claim 2, comprising a) from about 10% to about 12% of a plurality of nanocapsules; and b) from about 43% to about 53% of a mixture of unencapsulated monomer, unencapsulated stabilizer and unencapsulated initiator.

6. The plurality of nanocapsules according to claim 1, wherein said plurality of nanocapsules having an average size of about 600 nanometers to about 900 nanometers.

7. The plurality of nanocapsules according to claim 1, wherein said plurality of nanocapsules have a silica coating.

8. The plurality of nanocapsules according to claim 1, wherein said plurality of nanocapsules having an average size of about 600 nanometers to about 1100 nanometers; and said plurality of nanocapsules having an average compressive strength of from 30 megapascals to about 70 megapascals.

9. The plurality of nanocapsules according to claim 1, consisting of a plurality of one kind of nanocapsule.

10. The plurality of nanocapsules according to claim 1, wherein each said core consists of:
a 1,6-hexanediol dimethacrylate monomer, catalyst, and tertiary amine selected from the group consisting of p-tolyl imino diethanol, ethyl dimethyl aminobenzoate, N,N'-dimethyl p-toluidine, triethylamine, dimethyl aniline and mixtures thereof.

11. The plurality of nanocapsules according to claim 1, wherein each said core consists of a 1,6-hexanediol dimethacrylate monomer, catalyst, and tertiary amine selected from the group consisting of p-tolyl imino diethanol, ethyl dimethyl aminobenzoate, and mixtures thereof.

12. A method of providing a self-healing capability to an article comprising:
applying a substrate nanocapsule mixture according to claim 2 to the surface and/or interior of an article; and
curing said substrate nanocapsule mixture by subjecting said substrate nanocapsule mixture to light and/or chemically curing said substrate nanocapsule mixture by rupturing one or more of said substrate nanocapsule mixture's nanocapsules.

13. The method of claim 12 wherein said light has a wavelength from about 380 nm to about 500 nm.

14. The method of claim 12 wherein said article is a tooth comprising a chip and/or cavity and said substrate nanocapsule mixture has been applied to said chip and/or cavity prior to curing said substrate nanocapsule mixture and said substrate nanocapsule mixture is optionally contoured after said curing.

15. The method of claim 12 wherein said chip and/or cavity is subjected to one, two, three, or all of the following processes: cleaning, etching, bonding agent treatment and bonding agent curing prior to the application of said substrate nanocapsule mixture.

16. The method of claim 12 wherein said substrate nanocapsule mixture is applied incrementally to said tooth exhibiting a chip and/or cavity at the time of defect correction; preferably said substrate nanocapsule mixture is cured incrementally during restoration process.

* * * * *